Figure 1:
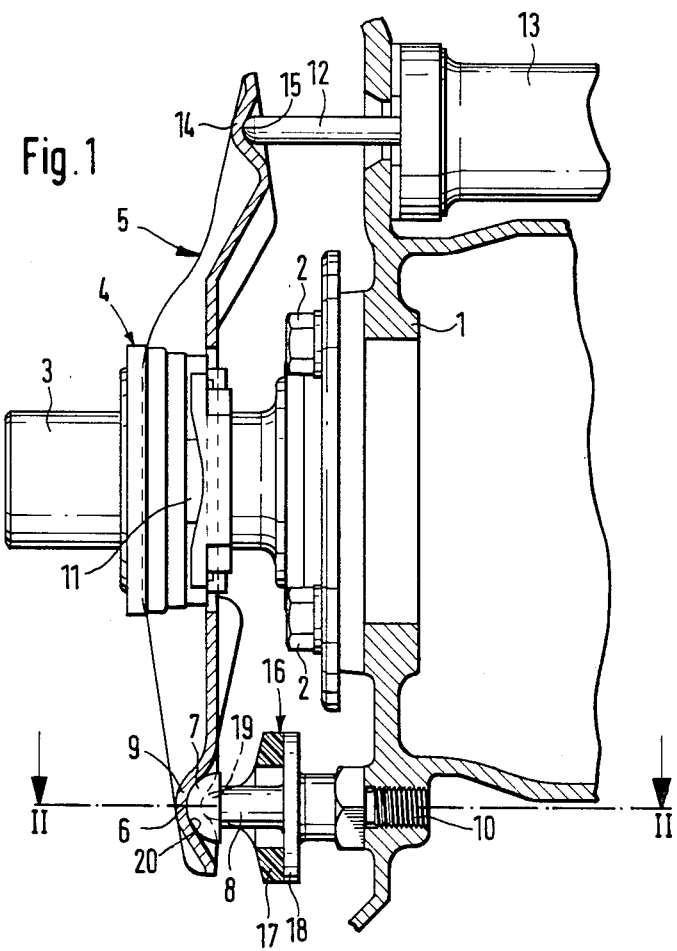

United States Patent [19]

Parzefall

[11] Patent Number: 4,773,516
[45] Date of Patent: Sep. 27, 1988

[54] NOVEL CLUTCH LEVER SUPPORT MEANS
[75] Inventor: Walter Parzefall, Bubenreuth, Fed. Rep. of Germany
[73] Assignee: INA Walzlager Schaeffler KG, Fed. Rep. of Germany
[21] Appl. No.: 24,587
[22] Filed: Mar. 11, 1987
[30] Foreign Application Priority Data Apr. 12, 1986 [DE] Fed. Rep. of Germany ....... 3612419

[51] Int. Cl.$^4$ ............................................. F16D 13/58
[52] U.S. Cl. ................................. 192/30 V; 192/99 S
[58] Field of Search ............... 192/30 V, 99 S; 74/526
[56] References Cited

U.S. PATENT DOCUMENTS 3,277,988 10/1966 Pinter ................................. 192/99 S
3,983,983 10/1976 Steiskal et al. ..................... 192/99 S

FOREIGN PATENT DOCUMENTS 1922913 11/1970 Fed. Rep. of Germany .... 192/99 S
2931816 2/1981 Fed. Rep. of Germany .... 192/99 S Primary Examiner—Rodney H. Bonck
Assistant Examiner—David A. Testardi
Attorney, Agent, or Firm—Bierman & Muserlian

[57] ABSTRACT

A support element for a clutch lever for motor vehicles wherein the clutch lever is supported at a pivotal point on one hand and is engaged by an actuator on the other hand and acts on a clutch release bearing longitudinally moveable on a guide tube which extends coaxially to the axis of a friction clutch, characterized in that a dampening element (16,21,24,26,29) made of polymeric material is provided at the pivotal point (6) which is designed and cooperates with the clutch lever (5) in such a manner that vibrations of the clutch lever (5) about a longitudinal axis extending through pivotal point (6) on the one hand and the point of contact (15) of the an actuator (12) on the other hand are prevented or absorbed.

5 Claims, 6 Drawing Sheets

NOVEL CLUTCH LEVER SUPPORT MEANS

STATE OF THE ART

Support means for clutch levers for motor vehicles wherein the support lever is supported at a pivotal point on one hand and is engaged by an actuating means on the other hand and acts on a clutch release bearing longitudinally moveable on a guide tube extending coaxial to the axis of the friction clutch are known.

While such clutch levers have been swingably mounted about a bolt, several reasons, especially simpler assembly has led recently to proposals to obtain the pivotal point by providing a support bolt with a spherical head engaging on a corresponding indentation in the clutch lever. Apart from the achieved advantages, drawbacks are encountered primarily because these clutch levers swing also about a longitudinal axis which extends through the pivotal point, on the one hand, and the point of application of the actuating means, on the other hand.

The latest friction clutches frequently use disk springs with freely projecting tongues which are engaged by the clutch release bearing. For manufacturing reasons, the ends of the spring tongues do not always extend exactly in a plane rectangular to the clutch axis so that these spring tongues cause the engaging clutch release bearing to wobble. The vibrations thus exerted on the clutch release bearing are passed onto the clutch lever thereby causing small impacts of high frequency between the latter and its contact surfaces with the clutch release bearing. Since in modern motor vehicles, the clutch release bearing is constantly forced by the release lever against the disk spring tongues at a slight preload so that the clutch release bearing continuously rotates, the motor vehicle is constantly subjected to the vibrating strain over its entire operating life. This strain is especially disadvantageous when the casing of the clutch release bearing is made of synthetic material as is usually now the case for weight reasons. In these cases, it was determined that the vibrating and beating relative movement between the clutch lever and the casing of the clutch release bearing leads very rapidly to damage and frequently to destruction of the latter.

OBJECTS OF THE INVENTION

It is the object of the invention to improve the support of the clutch lever in a constructively simple and uncomplicated manner to prevent or at least to essentially absorb damaging vibrations.

This and other objects and advantages of the invention will become obvious from the following detailed description.

THE INVENTION

The novel support means of the invention for a clutch lever for motor vehicles wherein the clutch lever is supported at a pivotal point on one hand and is engaged by actuating means on the other hand and acts on a clutch release bearing longitudinally moveable on a guide tube which extends coaxially to the axis of a friction clutch, is characterized in that a dampening element (16,21,24,26,29) made of polymeric material is provided at the pivotal point (6) which is designed and cooperates with the clutch lever (5) in such a manner that vibrations of the clutch lever (5) about a longitudinal axis extending through pivotal point (6) on the other hand and the point of contact (15) of the actuating means (12) on the other hand are prevented or absorbed.

In a support in which the pivotal point is defined by a support bolt with a spherical head engaging a respective spherical indentation of the clutch lever, the support bolt can be provided with a radial flange at a distance from the spherical head to support the dampening element which additionally abuts the clutch lever at at least two points which are aligned along a straight line extending through the pivotal point and are perpendicular to the longitudinal axis.

It goes without saying that the straight line need not necessarily extend precisely through the pivotal point but may also extend parallel in an offset manner to such a straight line. In any case, this simple measure results in that the clutch lever can swing only in one plane which contains the clutch axis as well as the pivotal point while damaging vibrations about its longitudinal axis are eliminated.

In a most simple construction, this object can be attained by providing a circular ring-shaped dampening element which abuts two beadshaped projections of the clutch lever. The dampening element may also be designed, on the one hand, with a circular ring-shaped surface supported by the radial flange and, on the other hand, with two diametrically opposed projections and recesses contacting correspondingly designed recesses and projections of the clutch lever. By interlocking these projections and recesses, the dampening element is simultaneously secured in its position relative to the clutch lever so that no rotation is possible.

However, it is also possible to arrange the dampening element on the clutch lever and to provide it with two diametrically opposed projections supported by the radial flange of the support bolt. Such a design has the advantage that the dampening element can be connected to the clutch lever before the latter is installed so that it cannot be forgotten at a later time.

When in the previously described embodiment the dampening element has been provided as an additional element to the support which usually is metallic, it is also within the scope of the invention to use the dampening element simultaneously as a support for the clutch lever. In this case, the pivotal point is defined by a polymeric element which is provided with a projection and a recess cooperating in form-fitting manner with a corresponding recess and a corresponding projection on the clutch lever and which supports the clutch lever at both sides of the actual pivotal point along a straight line extending perpendicularly to its longitudinal axis.

To prevent the clutch lever from laterally sliding off, the polymeric element can be provided at the side facing the clutch lever with an additional bolt-like projection penetrating through an opening of the clutch lever.

Figure 2:
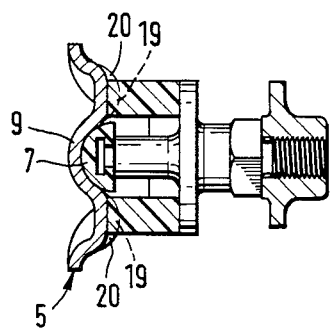

Referring now to the drawings:

FIG. 1 is a partial longitudinal cross-section of the arrangement of an installed clutch lever, FIG. 2 is a cross-section taken along the line II—II of FIG. 1 and FIGS. 3 to 12 show further modified embodiments of the invention in two respective cross-sectional views.

In FIG. 1, the wall 1 of a gear box housing has secured thereto a guide tube 3 by screws 2 and guided along this guide tube 3 is a clutch release bearing 4 which is moveable in a longitudinal direction. By shifting toward the left, the clutch release bearing engages the release elements of the not-shown friction clutch.

The longitudinal displacement of the clutch release bearing 4 is obtained through clutch lever 5 and the latter is rotatably supported about a pivotal point 6 because the spherical head 7 of a support bolt 8 engages in a spherical indentation 9 of the clutch lever 5. The support bolt 8 is secured in the wall 1 of the gearbox case by a thread 10.

The clutch lever lies flat at a crowned projection 11 of the clutch release bearing 4 and at the opposite end of the clutch lever 5, the plunger 12 of a hydraulic operating cylinder 13 engages with a spherical indentation 14 of the clutch lever 5 to define a point of support 15. To prevent vibrations of the clutch lever 5 about an imaginary longitudinal axis extending through the pivotal point 6, on the one hand and through the point of support 15, on the other hand, the support bolt 8 is provided with a dampening element 16 which is a circular ring 17 supported by a radial flange of the bolt 8 and has projections 19 engaging recesses 20 of the clutch lever 6 on both sides of the indentation 9. The contact between the elements 19 and 20 on both sides of the spherical head 7 prevents or at least sufficiently absorbs vibrations of the clutch lever 5 about its longitudinal axis.

Figure 3:
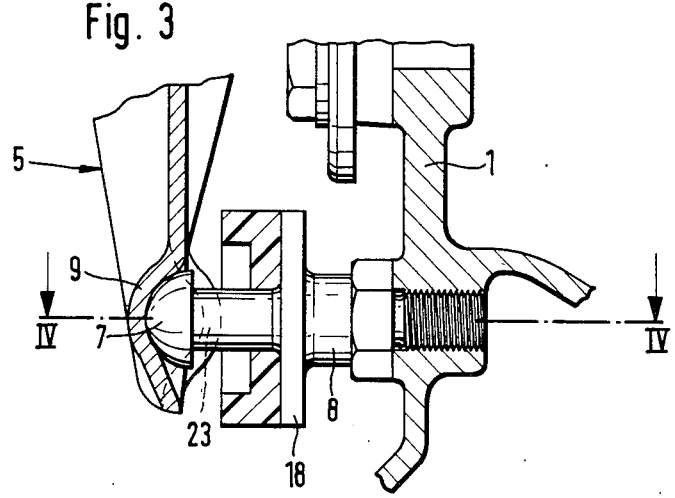
Figure 4:
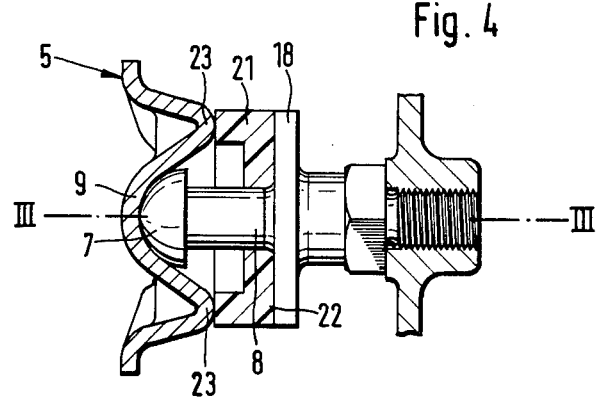

FIGS. 3 and 4 show a modification of the invention wherein a circular dampening element 21 is centered on the support bolt 8 by its annular flange 22 and is supported by the radial flange 18. On both sides of the indentation 9, the clutch lever 5 is provided with bead-shaped projections 23 abutting the dampening element 21.

Figure 5:
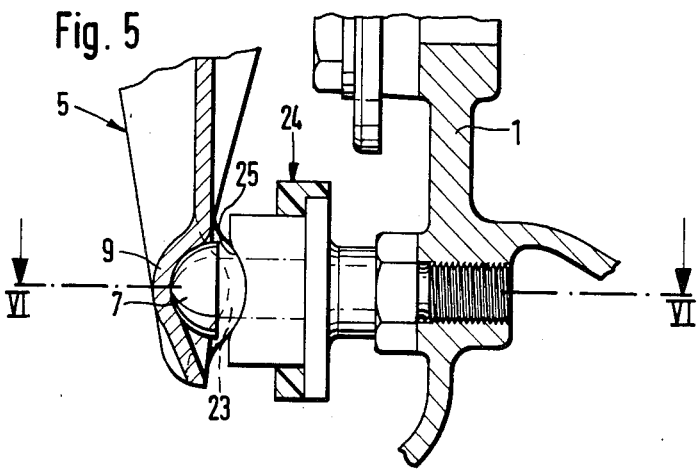
Figure 6:
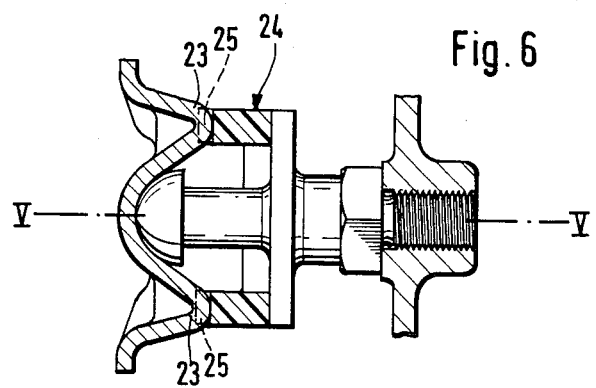
Figure 7:
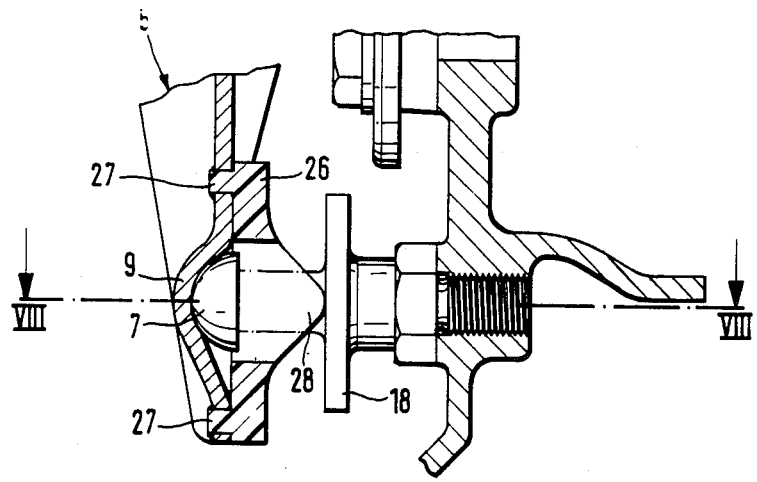
Figure 8:
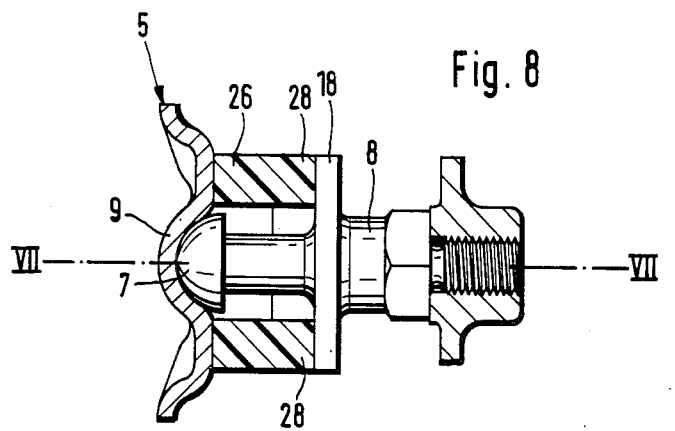

The embodiment shown in FIGS. 5 and 6 corresponds essentially with the previous one, but the dampening element 24 is additionally provided with trough-shaped recesses 25 engaged in a form-fitting manner by the bead-shaped projections 23 of the clutch lever 5. In contrast thereto, the embodiment illustrated in FIGS. 7 and 8 is that a dampening element 26 is secured to the clutch lever 5 by rivet-like joints 27 and abuts with two diametrically opposed projections 28 against the radial flange 18 of the support bolt 8.

Figure 9:
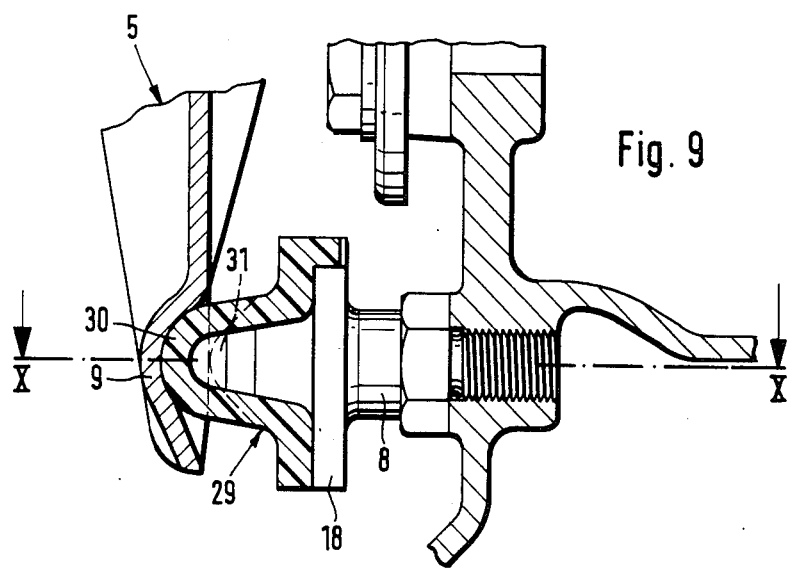
Figure 10:
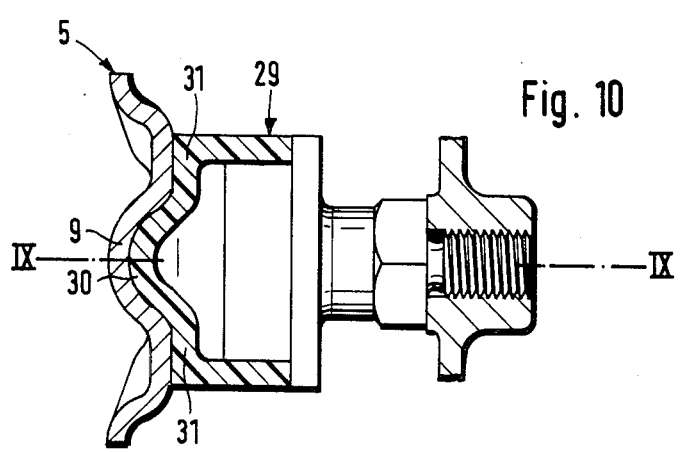

FIGS. 9 and 10 show an embodiment in which a dampening element 29 is attached to the support bolt 8 and supported by the radial flange 18. In this case, the support bolt 8 is not provided with a spherical head which is replaced by the spherical projection 30 of the dampening element 29 which projection engages the spherical indentation 9 of the clutch lever 5. Arranged on both sides of this spherical projection 30 are further projections 31 supported along flat surfaces of the clutch lever 5.

Figure 11:
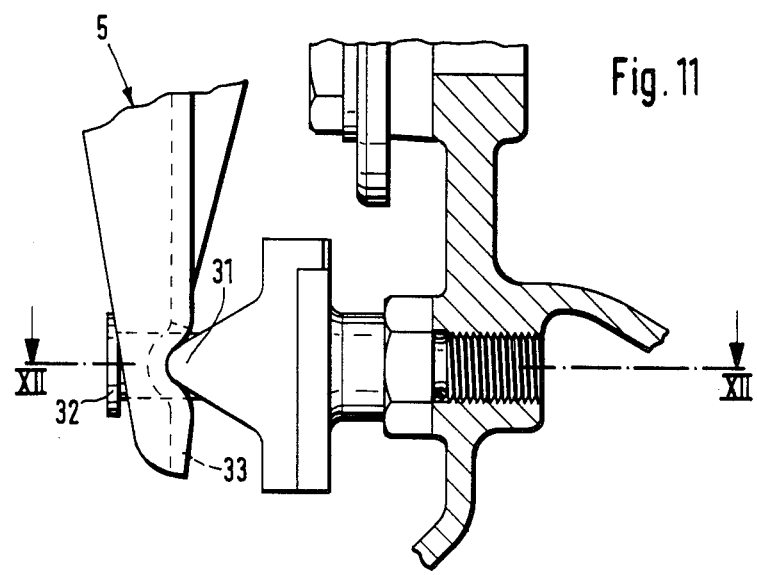
Figure 12:
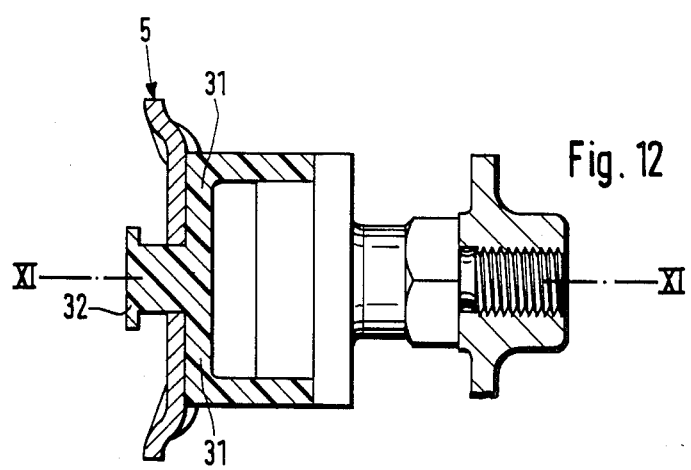

Finally, the embodiment illustrated in FIGS. 11 and 12, differs from the previous embodiment in that no spherical projection 30 is provided. Projection 30 has the function to prevent a lateral drifting of the clutch lever 5 from the dampening element 29. This function is assumed in the embodiment of FIGS. 11 and 12 by the bolt-like projection 32 traversing through an opening 33 in the clutch lever 5.

Various modifications of the support means of the invention may be made without departing from the spirit or scope thereof and it is to be understood that the invention is intended to be limited only as defined in the appended claims.

What I claim is:

1. A support means for a clutch lever for motor vehicles wherein the clutch lever is supported at a pivotal point on one hand and is engaged by actuating means on the other hand and acts on a clutch release bearing longitudinally moveable on a guide tube which extends coaxially to the axis of a friction clutch, characterized in that a dampening element (16,21,24,26,29) made of polymeric material is provided at the pivotal point (6) which is designed and cooperates with the clutch lever (5) in such a manner that vibrations of the clutch lever (5) about a longitudinal axis extending through pivotal point (6) on the one hand and the point of contract (15) of the actuating means (12) on the other hand are prevented or absorbed, the pivotal point is a support bolt with a spherical head engaging a corresponding spherical indentation in the clutch lever and the support bolt (8) is provided at a distance from the spherical head (7) with a radial flange (18) supporting the dampening element (16,21,24,29) which abuts the clutch lever (5) at at least two points aligned along a straight line extending through the pivotal point (6) and perpendicular to the longitudinal axis, and the dampening element (21) has a circular ring shape and abuts two bead-shaped projections (23) of the clutch lever (5).

2. A support means for a clutch lever for motor vehicles wherein the clutch lever is supported at a pivotal point on one hand and is engaged by actuating means on the other hand and acts on a clutch release bearing longitudinally moveable on a guide tube which extends coaxially to the axis of a friction clutch, characterized in that a dampening element (16,21,24,26,29) made of polymeric material is provided at the pivotal point (6) which is designed and cooperates with the clutch lever (5) in such a manner that vibrations of the clutch lever (5) about longitudinal axis extending through pivotal point (6) on the one hand and the point of contact (15) of the actuating means (12) on the other hand are prevented or absorbed, the pivotal point is a support bolt with a spherical head engaging a corresponding spherical indentation in the clutch lever and in that the support bolt (8) is provided at a distance from the spherical head (7) with a radial flange (18) supporting the dampening element (16,21,24,29) which abuts the clutch lever (5) at at least two points aligned along a straight line extending through the pivotal point (6) and perpendicular to the longitudinal axis and the dampening element (16,21,24,29) includes a surface of circular ring shape supported by the radial flange (18) and contacts with two diametrically opposes projections (19,31) or recesses (25) corresponding recesses (20) or projections (23) of the clutch lever 5.

3. A support means for a clutch lever for motor vehicles wherein the clutch lever is supported at a pivotal point on one hand and is engaged by actuating means on the other hand and acts on a clutch release bearing longitudinally moveable on a guide tube which extends coaxially to the axis of a friction clutch, characterized in that a dampening element (16,21,24,26,29) made of polymeric material is provided at the pivotal point (6) which is designed and cooperates with the clutch lever (5) in such a manner that vibrations of the clutch lever (5) about a longitudinal axis extending through pivotal point (6) on the one hand and the point of contact (15) of the actuating means (12) on the other hand are prevented or absorbed and the pivotal point is a support bolt with a spherical head which engages a corresponding spherical indentation of the clutch lever, the dampening element (26) is secured to the clutch lever (5) and has two diametrically opposed projections (28) abutting a radial flange (18) of the support bolt (8).

4. A support means for a clutch lever for motor vehicles wherein the clutch lever is supported at a pivotal point on one hand and is engaged by actuating means on the other hand and acts on a clutch release bearing longitudinally moveable on a guide tube which extends coaxially to the axis of a friction clutch, characterized in that a dampening element (16,21,24,26,29) made of polymeric material is provided at the pivotal point (6) which is designed and cooperates with the clutch lever (5) in such a manner that vibrations of the clutch lever (5) about a longitudinal axis extending through pivotal point (6) on the one hand and the point of contact (15) of the actuating means (12) on the other hand are prevented or absorbed and the pivotal point is a polymeric element (29) provided with a projection (31) or a recess cooperating in a form-fitting manner with a corresponding recess or a corresponding projection of the clutch lever (5) and which supports the clutch lever (5) on both sides of the pivotal point along a straight line extending perpendicular to said longitudinal axis.

5. A support means of claim 4 wherein the polymeric element (29) is provided with an additional bolt-like projection (32) on its side facing the clutch lever (5) which penetrates through an opening (33) of the clutch lever (5).

* * * * *